United States Patent [19]
Koizumi

[11] 3,883,231
[45] May 13, 1975

[54] OBJECTIVE LENS SYSTEMS FOR USE IN MICROSCOPES

[75] Inventor: Tsohimichi Koizumi, Tsukui-machi, Kanagawa Pref., Japan

[73] Assignee: Olumpus Optical Company Limited

[22] Filed: Nov. 5, 1973

[21] Appl. No.: 412,725

Related U.S. Application Data

[63] Continuation-in-part of Ser. No. 277,821, Aug. 3, 1972, abandoned.

[30] Foreign Application Priority Data
Aug. 4, 1971  Japan.............................. 46-58354

[52] U.S. Cl. ......... 350/220; 350/175 ML; 350/177; 350/222; 350/223
[51] Int. Cl. .............................................. G02b 9/34
[58] Field of Search .... 350/220, 222, 223, 175 ML, 350/177

[56] References Cited
UNITED STATES PATENTS

| | | | |
|---|---|---|---|
| 2,363,770 | 11/1944 | Bennett....................... | 350/175 ML |
| 2,781,694 | 2/1957 | Takahashi................... | 350/175 ML |
| 2,978,957 | 4/1961 | Becker et al................ | 350/175 ML |
| 3,532,414 | 10/1970 | Higuchi et al. ............. | 350/223 X |
| 3,572,902 | 3/1971 | Uetake........................ | 350/175 ML |

*Primary Examiner*—Saxfield Chatmon, Jr.

[57] ABSTRACT

An objective lens system for use in microscopes, which is constructed as four lens components and seven lenses and comprises a first component consisting of a single lens having a positive refractive power and made of a general optical glass having a high refractive index and low Abbe's number; a second component consisting of a compound lens having a negative refractive power and made of a general optical glass; the first and second components constituting a front lens system having a negative refractive power; a third component consisting of a single lens having a positive refractive power and made of an optical crystal or general optical glass having a high Abbe's number; and a fourth component consisting of a compound lens having a positive refractive power and and including a lens having a positive refractive power and made of an optical crystal or general optical glass having a high Abbe's number and held between two further lenses, each having a negative refractive power and made of a general optical glass, the third and fourth components constituting a rear lens system having a positive power, and all lenses being arranged in succession from the side of an object (not shown), and which is defined by six specific conditions.

5 Claims, 25 Drawing Figures

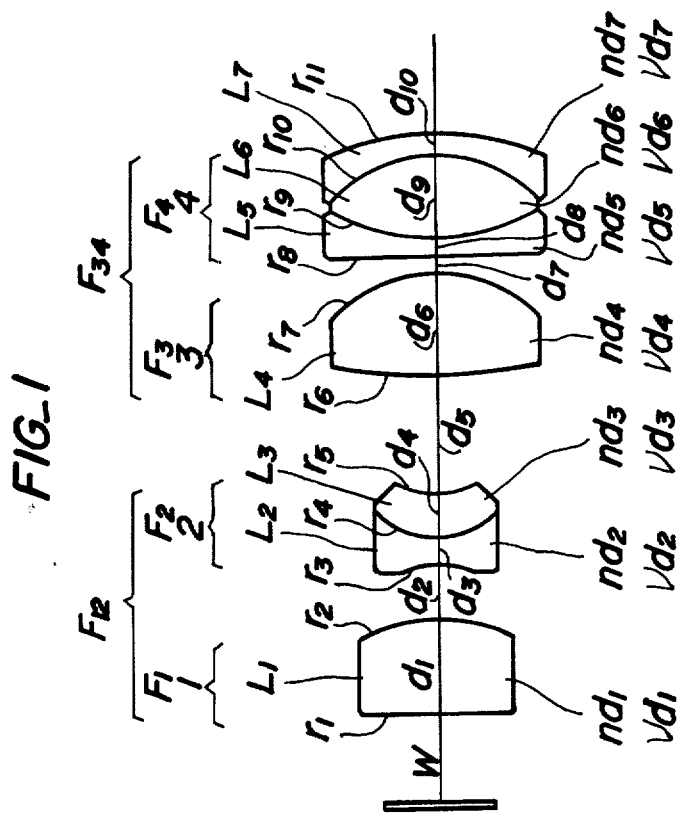

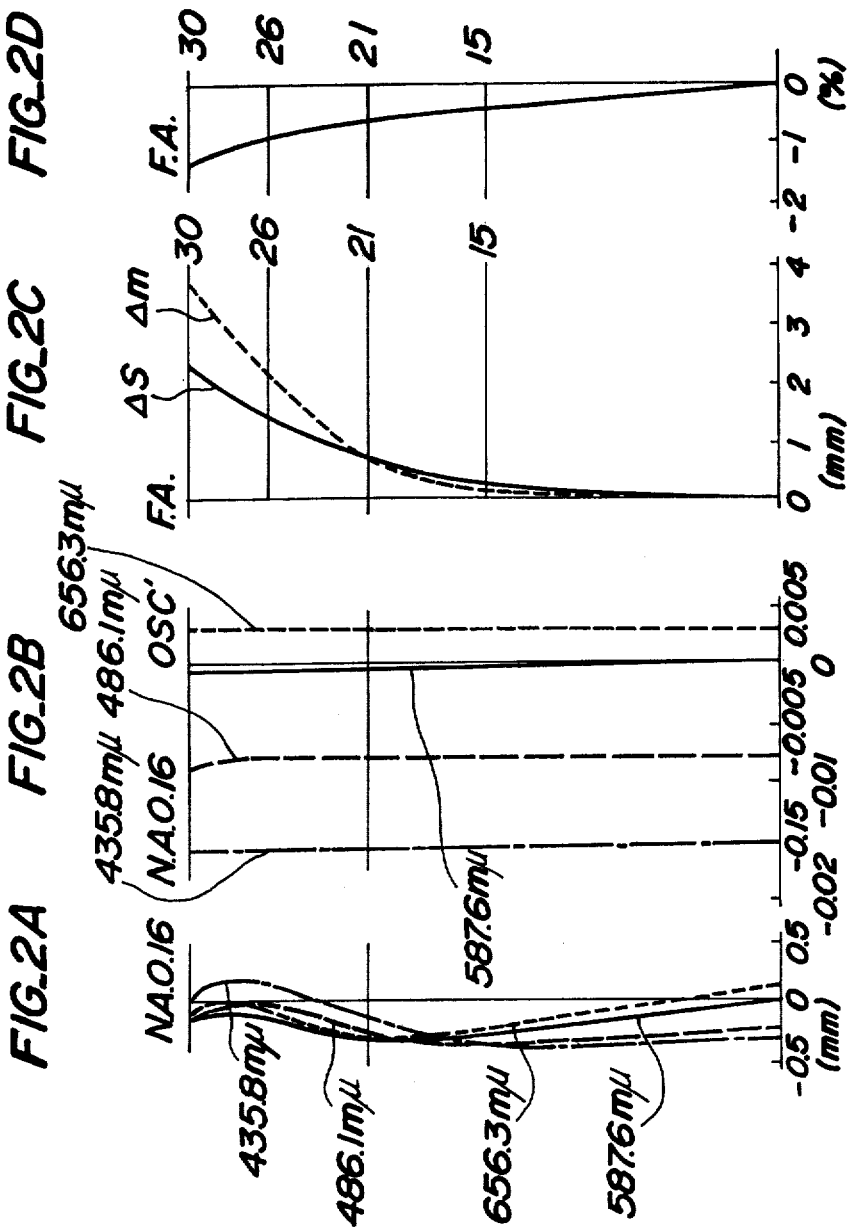

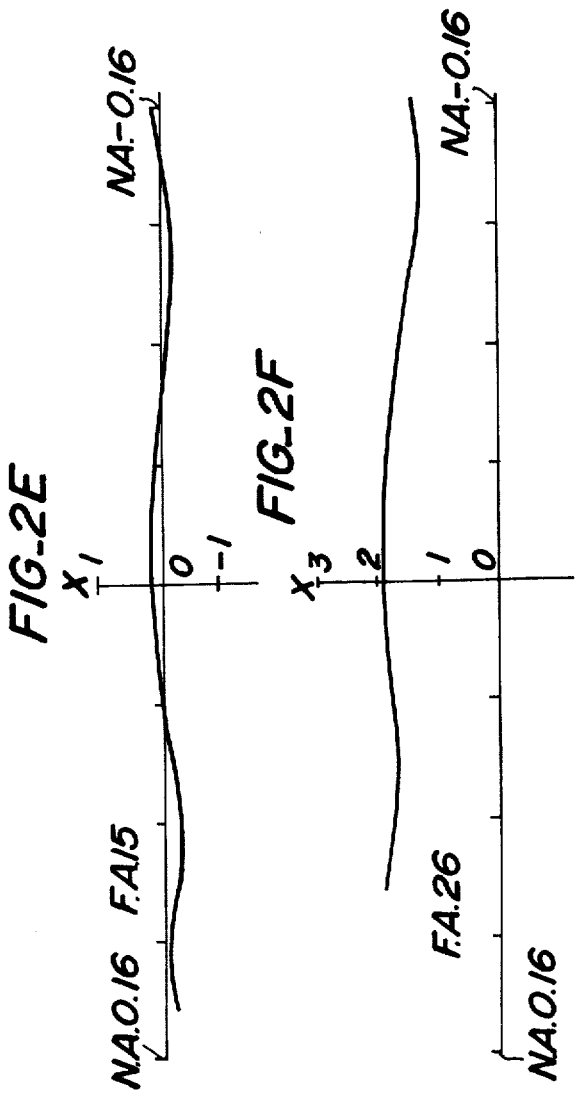

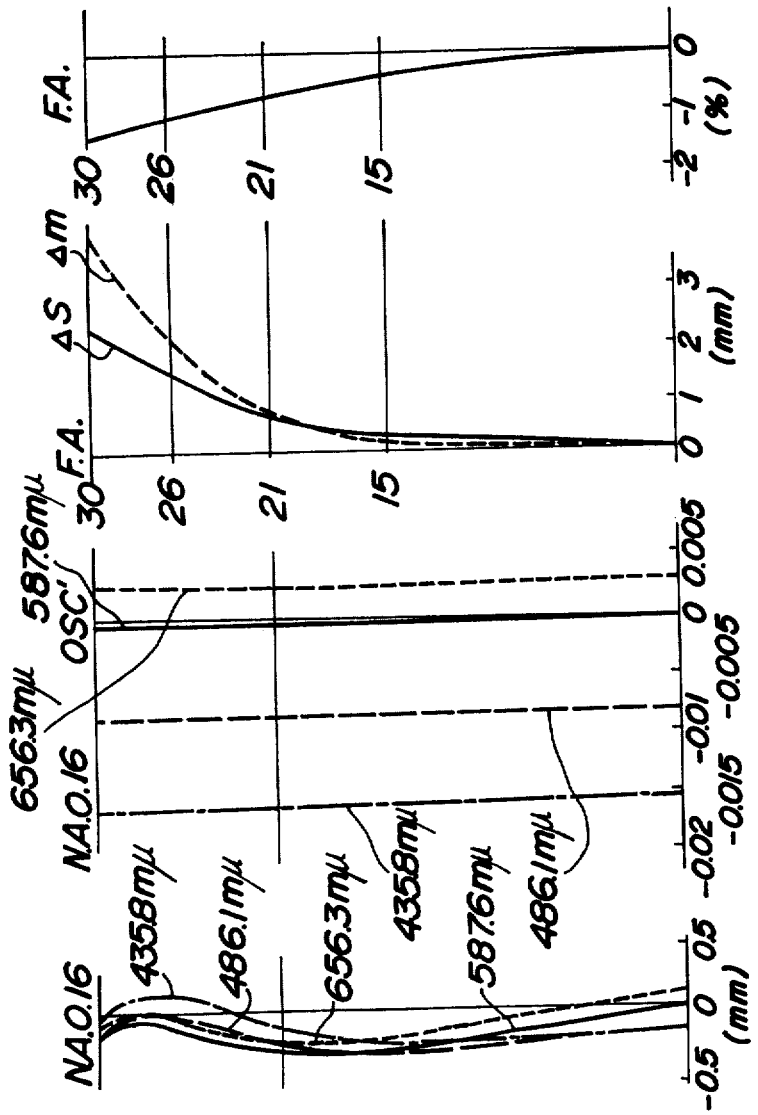

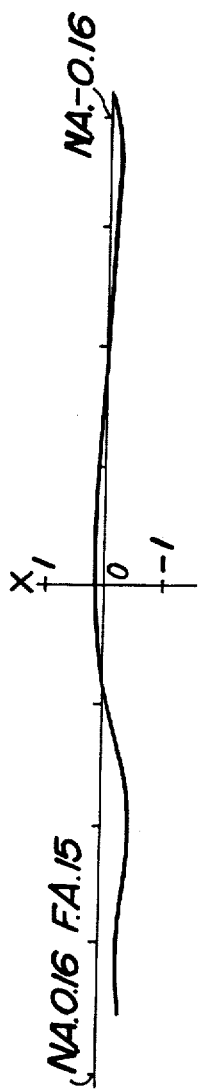
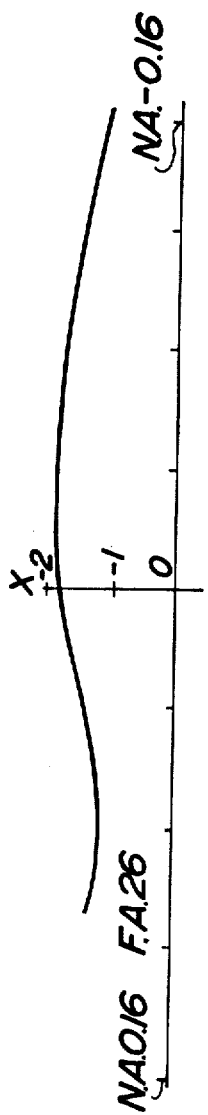

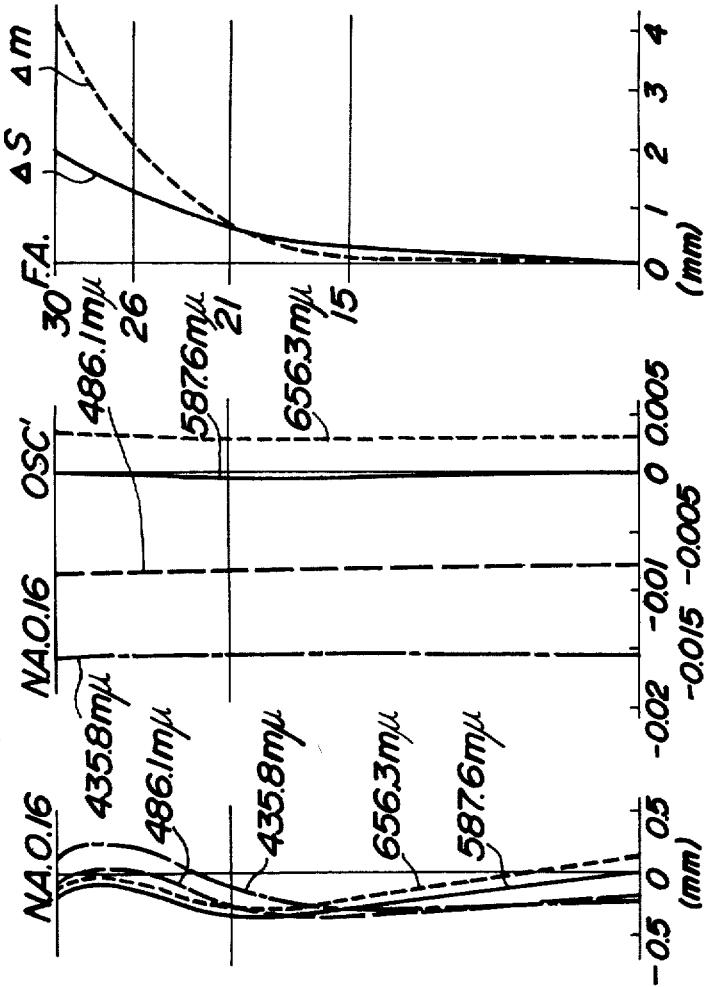

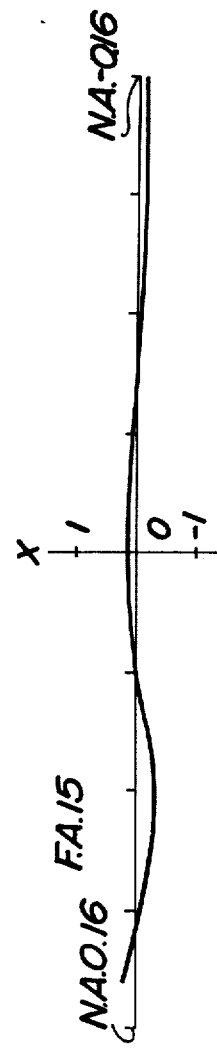
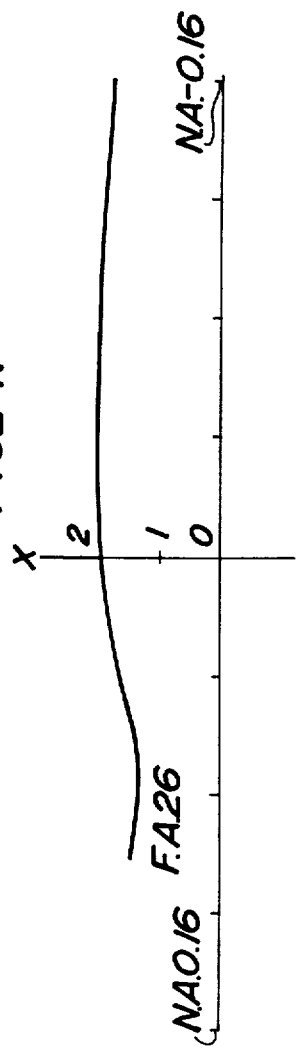
FIG_4E
FIG_4F

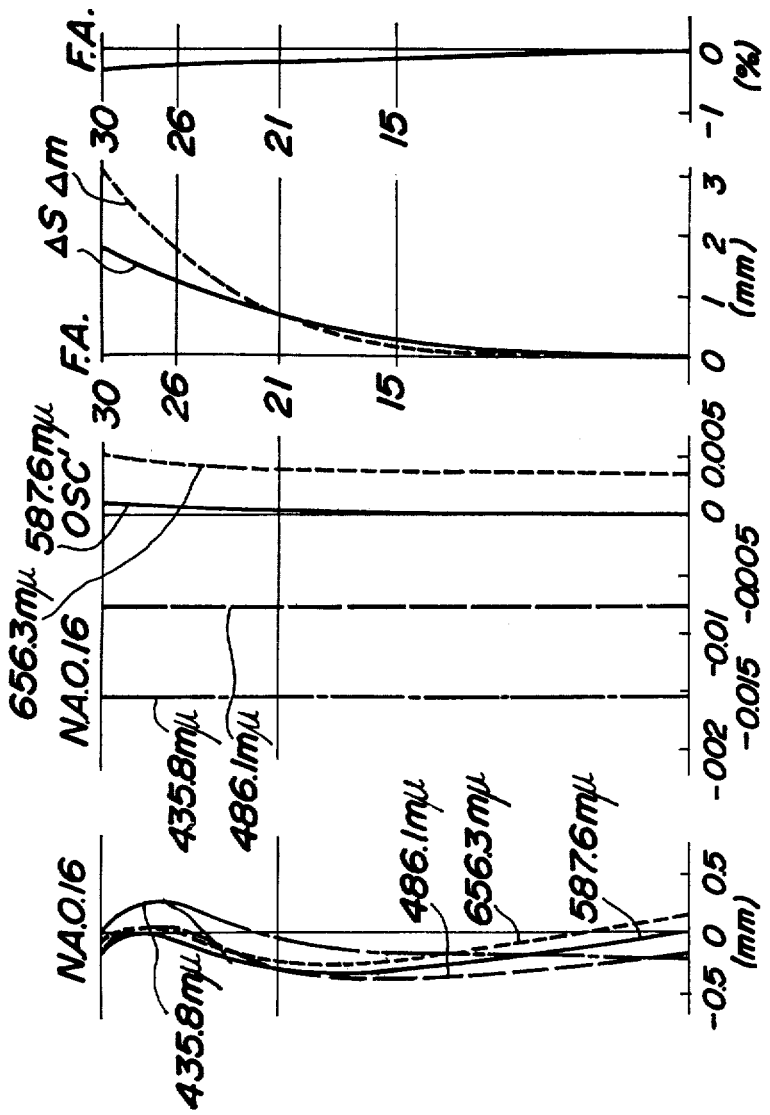

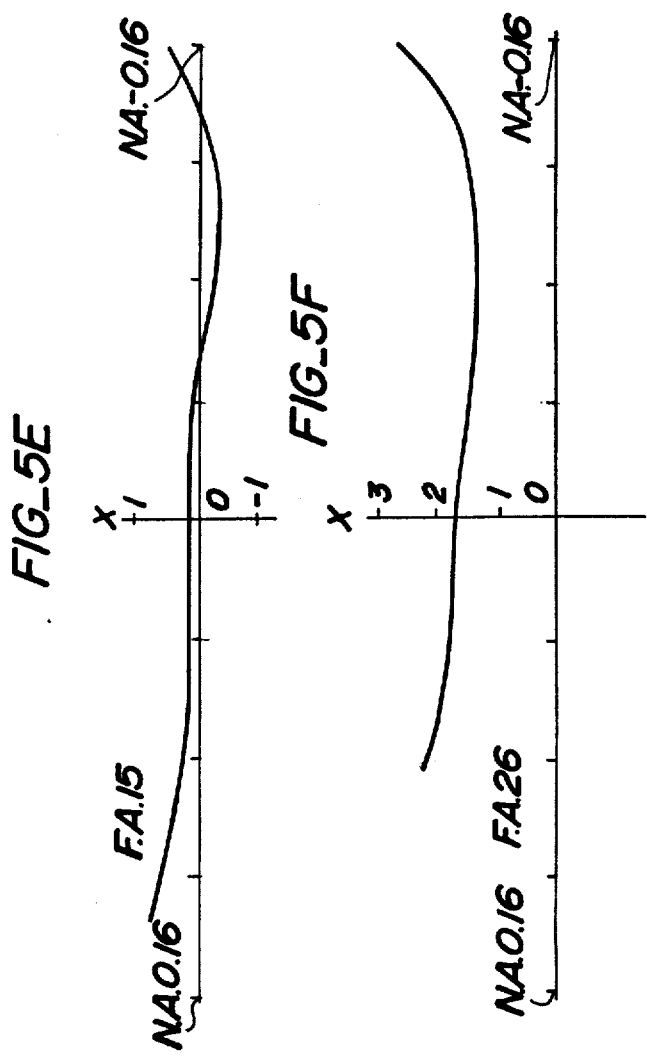

OBJECTIVE LENS SYSTEMS FOR USE IN MICROSCOPES

This application is a continuation-in-part of my copending application Ser. No. 277,821, filed Aug. 3, 1972, now abandoned.

This invention relates to an apochromatic objective lens system for use in microscopes.

An object of the invention, by adopting suitable dimensions for successive lens components and suitable combinations and arrangements thereof, is to provide an apochromatic objective lens system for use in microscopes, small in the number of lenses, and having a small magnification and flat image surface over a wide field of view up to F.A. 30°, and significantly corrected chromatic and spherical aberration, particularly corrected chromatic aberration at the third wave length of 435.8 m$\mu$ (g-line in general) called as a secondary spectrum.

For a better understanding of the invention, the same will be explained by reference to the accompanying drawings, in which:

FIG. 1 shows in cross-section an objective lens system constructed according to the invention; and FIGS. 2A to 2F, 3A to 3F, 4A to 4F and 5A to 5F show various aberration curves of four embodiments of the objective lens system according to the invention shown in FIG. 1, respectively.

In FIG. 1 is shown an objective lens system for use in microscopes according to the invention, which is constructed as four lens components 1 to 4 and seven lenses $L_1$ to $L_7$.

The first component 1 consists of a single lens $L_1$ having a positive refractive power and made of a general optical glass having a high refractive index and a low Abbe's number.

The second component 2 consist of a compound lens $L_2$, $L_3$ having a negative refractive power and made of a general optical glass.

In the illustrated preferred embodiment, lens $L_2$ is a biconcave lens which is cemented to positive meniscus lens $L_3$. The first and second components 1 and 2 constitute a front lens system having a negative refractive power.

The third component 3 consists of a single lens $L_4$ having a positive refractive power and made of an optical crystal or general optical glass having a high Abbe's number.

The fourth component 4 consists of a compound lens having a positive refractive power and comprising a lens $L_6$ having a positive refractive power and made of an optical crystal or general optical glass having a high Abbe's number and held between two lenses $L_5$ and $L_7$ each having a negative refractive power and made of a general optical glass.

In the illustrated preferred embodiment, lens $L_5$ is a negative lens cemented to biconvex lens $L_6$ and to negative meniscus lens $L_7$. The third and fourth components 3 and 4 constitute a rear lens system having a positive refractive power. All lenses $L_1$ to $L_7$ are arranged in succession from the side of an object (not shown).

As described above, in accordance with the invention, the two lenses $L_4$ and $L_6$ are made of an optical crystal or optical glass whose Abbe's number is high, but all of the other lenses $L_1$, $L_2$, $L_3$, $L_5$ and $L_7$ are made of general optical glass.

The total lens system is mainly divided into two lens systems, 1, 2 and 3, 4, respectively, the boundary being defined by the air space $d_5$. The front system 1, 2 is constructed so as to give a negative refractive power as a whole, whereas the rear lens system 3, 4 is constructed so as to give a positive refractive power. The front and rear lens systems comprise two components consisting of the single lens $L_1$; $L_4$ and the compound lens $L_2$, $L_3$; $L_5$, $L_6$, $L_7$.

The provision of the front lens system 1, 2 having a negative refractive power and the rear lens system 3, 4 having a positive refractive power makes it possible to locate the front focus near the lens system, and as a result, provide a retrofocus type lens system having the same focus as that of an objective lens having a high magnification with a given length of a body tube.

The objective lens system for use in microscopes according to the invention is defined by the following six conditions, i.e.

(1) $nd_1 \geq 1.73$, $vd_1 \leq 40$, $0.8 > \dfrac{F_1}{F'} > 0.37$, $\dfrac{|r_1|}{F'} \geq 1$;

(2) $15 \geq |vd_2 - vd_3|$, $vd_2 \geq 50$, $nd_2 \geq 1.55$,
$0.25 \geq \dfrac{r_4}{F'} \geq 0.1$, $0.25 > \dfrac{|F_2|}{F'} > 0.14$;

(3) $vd_4 \geq 70$, $0.7 > \dfrac{F_3}{F'} > 0.4$;

(4) $3 \geq \dfrac{F}{F'} \geq 1.5$, $\dfrac{|r_8|}{F'} \geq 10$, $vd_6 \geq 70$;

(5) $0.3 > \dfrac{d_5}{F'} > 0.12$; and (6) $1.5 > \dfrac{|F_{12}|}{F'} > 0.4$, $0.8 > \dfrac{F_{34}}{F'} > 0.3$, where $F'$ is the focal length of the total lens system, $F_1$, $F_2$, $F_3$ and $F_4$ are focal lengths of the first, second, third and fourth components, $F_{12}$ and $F_{34}$ are composite focal lengths of the front and rear lens system, $r_1, r_2, \ldots r_{11}$ are radii of curvatures of the successive lenses counted from the first component, $d_1, d_2, \ldots d_{10}$ are axial thicknesses or air spaces between the successive lenses, and $vd_1, vd_2, \ldots vd_7$ are respective Abbe's numbers of the lenses.

As described above, the first component 1 consists of a single lens $L_1$ having a positive refractive power and made of a general optical glass having a high refractive index and low Abbe's number. The lens $L_1$ has on its object side a flat or negative concave surface so as to correct spherical aberration.

In objective lenses whose magnification is low, if chromatic aberration is made achromatic between the wave lengths of 656.3 m$\mu$ and 486.1 m$\mu$, the magnification chromatic aberration tends to achromatic conditions. Moreover, if the secondary spectrum is removed, the magnification chromatic aberration becomes increased, and as a result, a combination of the objective lens system of the above kind and a correction type eye-piece causes overcorrection of the magnification chromatic aberration.

In accordance with the invention, in order to compensate such overcorrection, the magnification chromatic aberration in the front lens system 1, 2 is made with an undercorrection so as to match the magnification chromatic aberration of the total lens system with that of the correction type eye-piece, that is, the first condition $nd_1 \geq 1.73$, $vd_1 \leq 40$, $0.8 > F_1/F' > 0.37$, and $|r_1|/F' \geq 1$ must be satisfied.

The second component 2 consist of the compound lens $L_2$, $L_3$ having a negative refractive power and made of a general optical glass, as described before.

The second component 2 serves together with the first component 1 to provide undercorrection for the magnification chromatic aberration. Thus, the second component 2 is made of an optical glass whose Abbe's number $vd_2$ is high which satisfies the second condition, i.e. $vd_2 \geq 50$.

If the second component 2 is constructed by a single lens made of an optical glass satisfying the above condition, a decrease of the secondary spectrum causes coma at the superwide field of view larger than F.A. 24 to bend inwards owing to the increase of the refractive power at the air contact surface, thereby increasing astigmatism.

In order to correct such a disadvantage, the invention makes use of a compound lens made by combining the lenses $L_2$ and $L_3$ and the difference in the Abbe's numbers at the contact surface between these two lenses, and the negative refractive power is utilized to remove the secondary spectrum.

Moreover, to this negative refractive power is added the refractive powers of the surfaces of these lenses which are in contact with air to keep astigmatism and coma in balance. For this purpose, the second condition $0.25 > |F_2|/F' > 0.14$ is given. Here the condition $0.25 \geq r_4/F' \geq 0.1$ is given for the proportion of the refractive power at the contact surface of the lenses $L_2$ and $L_3$.

If the difference of the Abbe's numbers of the lenses $L_2$ and $L_3$ becomes large, the chromatic aberration of the spherical aberration on axis is intended to be overcorrected. Such overcorrection cannot be made by the rear lens system 3, 4. Thus, the second condition $15 \geq |vd_2-vd_3|$, $vd_2 \geq 50$, $nd_2 \geq 1.55$ must be satisfied.

The third component 3 consists of the single lens $L_4$ having a positive refractive power and made of an optical crystal or general optical glass having a high Abbe's number. If the third component 3 satisfies the third condition $vd_4 \geq 70$, $0.7 \geq F_3/F' \geq 0.4$, it is possible to reliably control divergence of the inclined rays from the second component 2 and also the chromatic aberration of the spherical aberration.

The fourth component 4 consist of the compound lens $L_5$, $L_6$, $L_7$ having a positive power and comprising the lens $L_6$ having a positive refractive power and made of an optical crystal or optical glass having a high Abbe's number ($vd_6 \geq 70$) and held between the two lenses $L_5$ and $L_7$ each having a negative refractive power and made of general optical glass, as described before.

The refractive power of the fourth component 4 is made positive so as to reliably correct the undercorrection of the secondary spectrum of the spherical aberration on axis caused by the front lens system 1 and 2. This correction can effectively be achieved by satisfying the fourth condition $$3 \geq \frac{F_4}{F'} > 1.5 \quad \text{and} \quad \frac{|r_3|}{F'} \geq 10.$$

The air space $d_5$ between the front lens system 1, 2 consisting of the first component $L_1$ and the second component $L_2$ and $L_3$ and the rear group of lens system 3, 4 consisting of the third component $L_4$ and fourth component $L_5$, $L_6$, $L_7$ is defined by the fifth condition $0.3 > d_5/F' > 0.12$.

Contrary to the above, if $d_5/F'$ is smaller than 0.12, the amount of correction for the magnification chromatic aberration becomes small. This is not suitable for the correction type eye-piece and causes the coma out of axis to bend inwards.

If $d_5/F'$ is larger than 0.3, the coma out of axis becomes small whereas the astigmatism becomes large at the superwide field of view (F.A. is larger than 24).

The final sixth condition $$1.5 > \frac{|F_{12}|}{F'} > 0.4 \quad \text{and} \quad 0.8 > \frac{F_{34}}{F'} > 0.3$$

relates to the length $F_{12}$ of the front lens system 1, 2 and to the focal length $F_{34}$ of the rear lens system 3, 4, with respect to the focal length $F'$ of the total lens system. If these conditions are satisfied, it is possible easily to balance the correction for aberrations of the total lens system.

The invention will now be described with reference to the following examples.

Example 1

| [r] | | [d] | [nd] | [vd] |
|---|---|---|---|---|
| $r_1$ | $-541.35$ | | | |
| | | $d_1$ 5.53 | $nd_1$ 1.78472 | $vd_1$ 25.7 |
| $r_2$ | $-10.08$ | | | |
| | | $d_2$ 2.78 | | |
| $r_3$ | $-6.1$ | | | |
| | | $d_3$ 1.71 | $nd_2$ 1.56873 | $vd_2$ 63.2 |
| $r_4$ | 5.125 | | | |
| | | $d_4$ 2.55 | $nd_3$ 1.67 | $vd_3$ 57.3 |
| $r_5$ | 6.616 | | | |
| | | $d_5$ 6.08 | | |
| $r_6$ | 29.34 | | | |
| | | $d_6$ 5.87 | $nd_4$ 1.43389 | $vd_4$ 95.2 |
| $r_7$ | $-9.226$ | | | |
| | | $d_7$ 1.14 | | |
| $r_8$ | $-823.51$ | | | |
| | | $d_8$ 1.18 | $nd_5$ 1.61342 | $vd_5$ 57.4 |
| $r_9$ | 12.878 | | | |
| | | $d_9$ 5.0 | $nd_6$ 1.48656 | $vd_6$ 84.5 |
| $r_{10}$ | $-7.52$ | | | |
| | | $d_{10}$ 1.09 | $nd_7$ 1.61765 | $vd_7$ 55.1 |
| $r_{11}$ | $-14.74$ | | | |
| $W = 4.46$, | | $F' = 27.803$, | $F_1 = 13.029$, | |
| $\Sigma P = -0.348$, | | $F_{12} = -17.135$, | $F_2 = -5.153$, | |
| N.A. $= 0.16$, | | $F_{34} = 15.33$, | $F_3 = 16.958$, | |
| Magnification $= -4.0$ X, | | | $F_4 = 64.247$ | | where $W$ is a work distance from the upper surface of a cover glass to the center of the optical axis of the first lens component, and $\Sigma P$ is the Petzval sum.

The present example 1 has a lens construction shown in FIG. 1.

Various aberration characteristic curves of the present embodiment are shown in FIGS. 2A to 2F. FIG. 2A shows spherical aberrations, FIG. 2B the OSC', FIG. 2C astigmatism values, FIG. 2D distortion, and FIGS. 2E and 2F comas out of axis at F.A. = 15 and F.A. = 26, respectively.

Example 2

| [r] | | [d] | [nd] | [vd] |
|---|---|---|---|---|
| $r_1$ | $\infty$ | | | |
| | | $d_1$ 5.7 | $nd_1$ 1.78472 | $vd_1$ 25.7 |
| $r_2$ | $-10.212$ | | | |
| | | $d_2$ 3.69 | | |
| $r_3$ | $-6.09$ | | | |

3,883,231

-Continued

Example 2

| $|r|$ | | $|d|$ | $|nd|$ | $|vd|$ |
|---|---|---|---|---|
| | | $d_3$ 1.77 | $nd_2$ 1.56873 | $vd_2$ 63.2 |
| $r_4$ | 5.0 | $d_4$ 2.59 | $nd_3$ 1.67 | $vd_3$ 57.3 |
| $r_5$ | 6.52 | $d_5$ 5.72 | | |
| $r_6$ | 30.463 | $d_6$ 5.98 | $nd_4$ 1.43389 | $vd_4$ 95.2 |
| $r_7$ | −8.944 | $d_7$ 0.94 | | |
| $r_8$ | ∞ | $d_8$ 1.20 | $nd_5$ 1.61342 | $vd_5$ 57.4 |
| $r_9$ | 13.626 | $d_9$ 5.11 | $nd_6$ 1.48656 | $vd_6$ 84.5 |
| $r_{10}$ | −7.5 | $d_{10}$ 1.08 | $nd_7$ 1.61765 | $vd_7$ 55.1 |
| $r_{11}$ | −14.858 | | | |

$W = 3.69$, $F' = 29.268$, $F_1 = 13.014$,
$\Sigma P = -0.35$, $F_{12} = -22.527$, $F_2 = -5.105$,
N.A. = 0.16, $F_{34} = 14.959$, $F_3 = 16.702$,
Magnification = −4.0 X, $F_4 = 61.307$ The present example also has a lens construction shown in FIG. 1.

Various aberration characteristic curves of the present embodiment are shown in FIGS. 3A to 3F. FIG. 3A shows spherical aberrations, FIG. 3B the OSC', FIG. 3C astigmatism values, FIG. 3D distortion, and FIGS. 3E and 3F comas out of axis at F.A. = 15 and F.A. = 26, respectively.

Example 3

| $|r|$ | | $|d|$ | $|nd|$ | $|vd|$ |
|---|---|---|---|---|
| $r_1$ | −40.582 | $d_1$ 4.5 | $nd_1$ 1.78472 | $vd_1$ 25.7 |
| $r_2$ | −8.556 | $d_2$ 5.1 | | |
| $r_3$ | −6.452 | $d_3$ 1.66 | $nd_2$ 1.56873 | $vd_2$ 63.2 |
| $r_4$ | 4.763 | $d_4$ 2.20 | $nd_3$ 1.67 | $vd_3$ 57.3 |
| $r_5$ | 6.52 | $d_5$ 5.93 | | |
| $r_6$ | 29.357 | $d_6$ 5.90 | $nd_4$ 1.43389 | $vd_4$ 95.2 |
| $r_7$ | −9.33 | $d_7$ 1.16 | | |
| $r_8$ | ∞ | $d_8$ 1.31 | $nd_5$ 1.61342 | $vd_5$ 57.4 |
| $r_9$ | 12.56 | $d_9$ 5.11 | $nd_6$ 1.48656 | $vd_6$ 84.5 |
| $r_{10}$ | −7.69 | $d_{10}$ 1.15 | $nd_7$ 1.61769 | $vd_7$ 55.1 |
| $r_{11}$ | −14.514 | | | |

$W = 3.43$, $F' = 30.76$, $F_1 = 13.012$,
$\Sigma P = 0.348$, $F_{12} = -35.035$, $F_2 = -5.375$,
N.A. = 0.16, $F_{34} = 15.25$, $F_3 = 17.107$,
Magnification = −4.0 X, $F_4 = 58.336$ The present example also has a lens construction shown in FIG. 1.

Various aberration characteristic curves of the present embodiment are shown in FIGS. 4A to 4F. FIG. 4A shows spherical aberrations, FIG. 4B the OSC', FIG. 4C astigmatism values, FIG. 4D distortion, and FIGS. 4E and 4F comas out of axis at F.A. = 15 and F.A. = 26, respectively.

Example 4

| $|r|$ | | $|d|$ | $|nd|$ | $|vd|$ |
|---|---|---|---|---|
| $r_1$ | ∞ | $d_1$ 4.5 | $nd_1$ 1.78472 | $vd_1$ 25.7 |
| $r_2$ | −9.539 | $d_2$ 3.61 | | |
| $r_3$ | −7.017 | | | |

-Continued

Example 4

| $|r|$ | | $|d|$ | $|nd|$ | $|vd|$ |
|---|---|---|---|---|
| | | $d_3$ 1.66 | $nd_2$ 1.56873 | $vd_2$ 63.2 |
| $r_4$ | 4.246 | $d_4$ 2.21 | $nd_3$ 1.67 | $vd_3$ 57.3 |
| $r_5$ | 5.663 | $d_5$ 6.79 | | |
| $r_6$ | 32.1 | $d_6$ 5.90 | $nd_4$ 1.43389 | $vd_4$ 95.2 |
| $r_7$ | −9.394 | $d_7$ 2.0 | | |
| $r_8$ | −464.618 | $d_8$ 1.03 | $nd_5$ 1.61342 | $vd_5$ 57.4 |
| $r_9$ | 12.56 | $d_9$ 5.09 | $nd_6$ 1.48656 | $vd_6$ 84.5 |
| $r_{10}$ | −7.69 | $d_{10}$ 1.04 | $nd_7$ 1.61769 | $vd_7$ 55.1 |
| $r_{11}$ | −14.556 | | | |

$W = 3.61$, $F' = 30.241$, $F_1 = 12.156$,
$\Sigma P = -0.35$, $F_{12} = -31.14$, $F_2 = -5.202$,
N.A. = 0.16, $F_{34} = 15.875$, $F_3 = 17.502$,
Magnification = −4.0 X, $F_4 = 63.424$ The present example also has a lens construction shown in FIG. 1.

Various aberration characteristic curves of the present embodiment are shown in FIGS. 5A to 5F. FIG. 5A shows spherical aberrations, FIG. 5B the OSC', FIG. 5C astigmatism values, FIG. 5D distortion, and FIGS. 5E and 5F comas out of axis at F.A. = 15 and F.A. = 26, respectively.

As seen from the above, the invention provides an apochromatic objective lens system small in the number of lenses, and having a small magnification and flat image surface over a wide field of view up to F.A. 30°, and significantly corrected chromatic and spherical aberration, particularly corrected chromatic aberration at the third wave length of 435.8 mµ (g-line in general) called as secondary spectrum, which, therefore, is particularly adapted for use in microscopes.

The six specific conditions are measures by which optimum values as defined by Examples 1 to 4 can be derived with ease. Absence of the six specific conditions results in a necessity of carrying out an extremely large number of calculations.

Among the conditions, the refractive index nd and Abbe's numbers vd are determined by the kinds of optical glass. The other parameters such as focal length F, radius of curvature r, axial thickness or air space d must be determined by extremely large number of calculations.

Under such circumstances, the six specific conditions as defined by the invention plays a role of measures by which the optimum values of F, r and d can be derived with ease and makes it possible to reduce the number of calculations.

What is claimed is:

1. An objective lens system for use in microscopes, which is constructed as four lens components and seven lenses, comprising: a first component consisting of a first lens having a positive refractive power and being made of general optical glass having a high refractive index and a low Abbe's number; a second component having a negative refractive power and being made of general optical glass, consisting of a biconcave second lens cemented to a positive meniscus third lens; said first and said second components constituting a front lens component system having a negative refractive power; a third component consisting of a biconvex fourth lens having a positive refractive power and being made of optical crystal or general optical glass having a high Abbe's number; and a fourth component having a positive refractive power, including a sixth lens having a positive refractive power and being made of optical crystal or general optical glass having a high Abbe's number, held between a fifth and seventh lens, the latter two having a negative refractive power and being made of general optical glass, said fifth lens being a negative lens cemented to said sixth and said seventh lenses, being respectively a biconvex and a negative meniscus lens; said third and said fourth components constituting a rear lens component system having a positive refractive power; and all lenses being arranged in succession from the side of an object, and which is defined by the following conditions:

(1) $nd_1 \geq 1.73, vd_1 \quad 4.0, 0.8 > \frac{F_1}{F'} > 0.37, \frac{r_1}{F'} \geq 1$;

(2) $15 \geq |vd_2 - vd_3|, vd_2 \geq 50, nd_2 \geq 1.55$,
$0.25 \geq \frac{r_4}{F'} \geq 0.1, 0.25 > \frac{|F_2|}{F'} > 0.14$;

(3) $vd_4 \geq 70, 0.7 > \frac{f_3}{F'} > 0.4$;

(4) $3 \geq \frac{F_4}{F'} \geq 1.5, \frac{|r_8|}{F'} \geq 10, v d_8 \geq 70$;

(5) $0.3 > \frac{d_5}{F'} > 0.12$; and (6) $1.5 > \frac{|F_{12}|}{F'} > 0.4, 0.8 > \frac{F_3}{F'} > 0.3$ where $F'$ is a focal length of the total lens system, $F_1$, $F_2$, $F_3$ and $F_4$ are respective focal lengths of said first, said second, said third and said fourth components, $F_{12}$ and $F_{34}$ are respective composite focal lengths of said front and said rear lens component systems, $r_1, r_2, \ldots r_{11}$ are radii of curvatures of the successive lenses counted from the first component, $d_1, d_2, \ldots d_{10}$ are axial thicknesses of or air spaces between the successive lenses, $nd_1, nd_2, \ldots nd_7$ are refractive indexes, and $vd_1, vd_2, \ldots vd_7$ are respective Abbe's numbers of said lenses.

2. An objective lens system for use in microscopes as claimed in claim 1, wherein $r_1$ to $r_{11}$, $d_1$ to $d_{10}$, $nd_1$ to $nd_7$ and $vd_1$ to $vd_7$ are defined by the following values

| | | | | | | |
|---|---|---|---|---|---|---|
| $r_1$ | −541.35 | $d_1$ | 5.53 | $nd_1$ 1.78472 | $vd_1$ 25.7 |
| $r_2$ | −10.08 | $d_2$ | 2.78 | | |
| $r_3$ | −6.1 | $d_3$ | 1.71 | $nd_2$ 1.56873 | $vd_2$ 63.2 |
| $r_4$ | 5.125 | $d_4$ | 2.55 | $nd_3$ 1.67 | $vd_3$ 57.3 |
| $r_5$ | 6.616 | $d_5$ | 6.08 | | |
| $r_6$ | 29.34 | $d_6$ | 5.87 | $nd_4$ 1.43389 | $vd_4$ 95.2 |
| $r_7$ | −9.226 | $d_7$ | 1.14 | | |
| $r_8$ | −823.51 | $d_8$ | 1.18 | $nd_5$ 1.61342 | $vd_5$ 57.4 |
| $r_9$ | 12.878 | $d_9$ | 5.0 | $nd_6$ 1.48656 | $vd_6$ 84.5 |
| $r_{10}$ | −7.52 | $d_{10}$ 1.09 | $nd_7$ 1.61765 | $vd_7$ 55.1 |
| $r_{11}$ | −14.74. | | | | |

3. An objective lens system for use in microscopes as claimed in claim 1, wherein $r_1$ to $r_{11}$, $d_1$ to $d_{10}$, $nd_1$ to $nd_7$ and $vd_1$ to $vd_7$ are defined by the following values

| | | | | | | |
|---|---|---|---|---|---|---|
| $r_1$ | ∞ | $d_1$ | 5.7 | $nd_1$ 1.78472 | $vd_1$ 25.7 |
| $r_2$ | −10.212 | $d_2$ | 3.69 | | |
| $r_3$ | −6.09 | $d_3$ | 1.77 | $nd_2$ 1.56873 | $vd_2$ 63.2 |
| $r_4$ | 5.0 | $d_4$ | 2.59 | $nd_3$ 1.67 | $vd_3$ 57.3 |
| $r_5$ | 6.52 | $d_5$ | 5.72 | | |
| $r_6$ | 30.463 | $d_6$ | 5.98 | $nd_4$ 1.43389 | $vd_4$ 95.2 |
| $r_7$ | −8.944 | $d_7$ | 0.94 | | |
| $r_8$ | ∞ | $d_8$ | 1.20 | $nd_5$ 1.61342 | $vd_5$ 57.4 |
| $r_9$ | 13.626 | $d_9$ | 5.11 | $nd_6$ 1.48656 | $vd_6$ 84.5 |
| $r_{10}$ | −7.5 | $d_{10}$ 1.08 | $nd_7$ 1.61765 | $vd_7$ 55.1 |
| $r_{11}$ | −14.858. | | | | |

4. An objective lens system for use in microscopes as claimed in claim 1, wherein $r_1$ to $r_{11}$, $d_1$ to $d_{10}$, $nd_1$ to $nd_7$ and $vd_1$ to $vd_7$ are defined by the following values

| | | | | | | |
|---|---|---|---|---|---|---|
| $r_1$ | −40.582 | $d_1$ | 4.5 | $nd_1$ 1.78472 | $vd_1$ 25.7 |
| $r_2$ | −8.556 | $d_2$ | 5.1 | | |
| $r_3$ | −6.452 | $d_3$ | 1.66 | $nd_2$ 1.56873 | $vd_2$ 63.2 |
| $r_4$ | 4.763 | $d_4$ | 2.20 | $nd_3$ 1.67 | $vd_3$ 57.3 |
| $r_5$ | 6.52 | $d_5$ | 5.93 | | |
| $r_6$ | 29.357 | $d_6$ | 5.90 | $nd_4$ 1.43389 | $vd_4$ 95.2 |
| $r_7$ | −9.33 | $d_7$ | 1.16 | | |
| $r_8$ | ∞ | $d_8$ | 1.31 | $nd_5$ 1.61342 | $vd_5$ 57.4 |
| $r_9$ | 12.56 | $d_9$ | 5.11 | $nd_6$ 1.48656 | $vd_6$ 84.5 |
| $r_{10}$ | −7.69 | $d_{10}$ 1.15 | $nd_7$ 1.61769 | $vd_7$ 55.1 |
| $r_{11}$ | −14.514. | | | | |

5. An objective lens system for use in microscopes as claimed in claim 1, wherein $r_1$ to $r_{11}$, $d_1$ to $d_{10}$, $nd$ to $nd_7$ and $vd_1$ to $vd_7$ are defined by the following values

| | | | | | | |
|---|---|---|---|---|---|---|
| $r_1$ | ∞ | $d_1$ | 4.5 | $nd_1$ 1.78472 | $vd_1$ 25.7 |
| $r_2$ | −9.539 | $d_2$ | 3.61 | | |
| $r_3$ | −7.017 | $d_3$ | 1.66 | $nd_2$ 1.56873 | $vd_2$ 63.2 |
| $r_4$ | 4.246 | $d_4$ | 2.21 | $nd_3$ 1.67 | $vd_3$ 57.3 |
| $r_5$ | 5.663 | $d_5$ | 6.79 | | |
| $r_6$ | 32.1 | $d_6$ | 5.90 | $nd_4$ 1.43389 | $vd_4$ 95.2 |
| $r_7$ | −9.394 | $d_7$ | 2.0 | | |
| $r_8$ | −464.618 | $d_8$ | 1.03 | $nd_5$ 1.61342 | $vd_5$ 57.4 |
| $r_9$ | 12.56 | $d_9$ | 5.09 | $nd_6$ 1.48656 | $vd_6$ 84.5 |
| $r_{10}$ | −7.69 | $d_{10}$ 1.04 | $nd_7$ 1.61769 | $vd_7$ 55.1 |
| $r_{11}$ | −14.556. | | | | |

* * * * *